Feb. 25, 1969  K. H. CARPENTER  3,428,996
REAR WINDOW WIPER
Filed Jan. 3, 1967
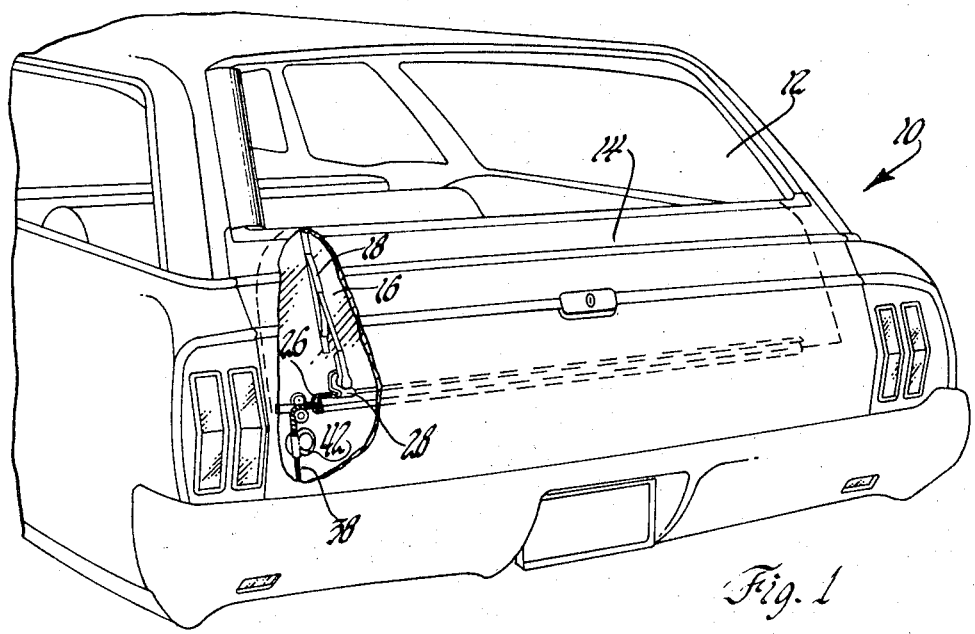
Fig. 1
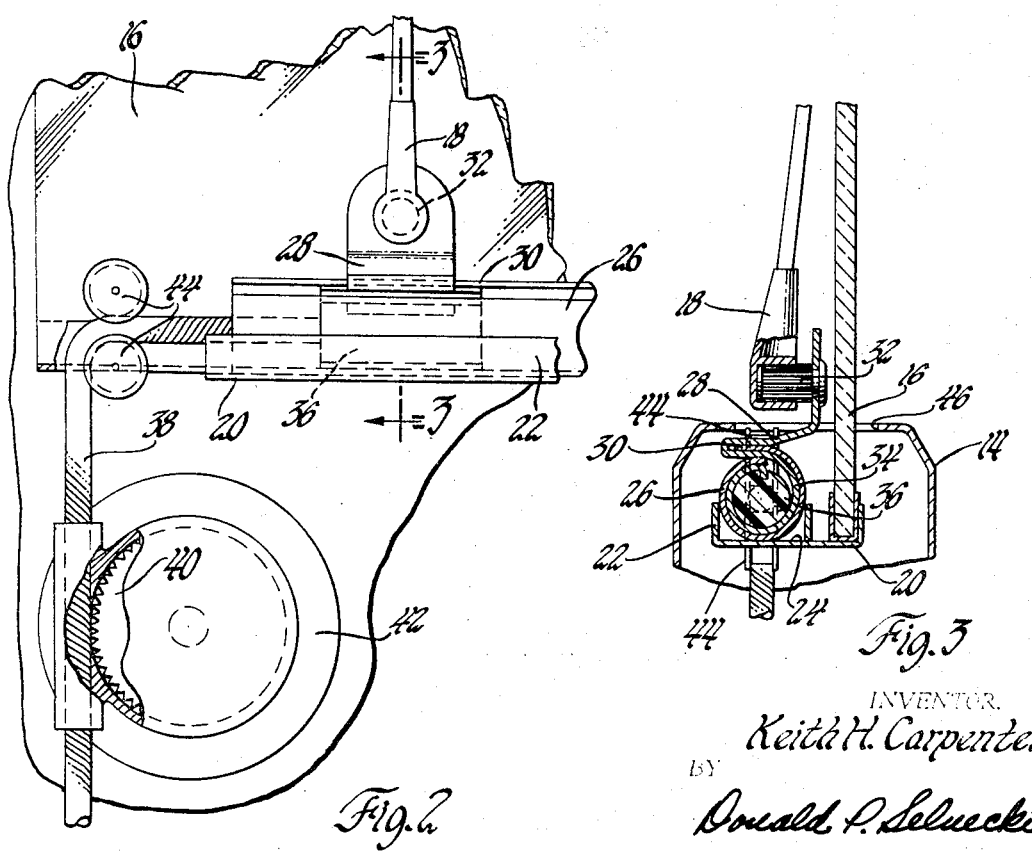
Fig. 2
Fig. 3
INVENTOR.
Keith H. Carpenter
BY
Donald P. Selnecki
ATTORNEY United States Patent Office 3,428,996
Patented Feb. 25, 1969

3,428,996
REAR WINDOW WIPER
Keith H. Carpenter, Kettering, Ohio, assignor to General Motors Corporation, Detroit, Mich., a corporation of Delaware
Filed Jan. 3, 1967, Ser. No. 606,911
U.S. Cl. 15—250.24    5 Claims
Int. Cl. B60s 1/06, 1/18

ABSTRACT OF THE DISCLOSURE

The present invention relates to a straight line reciprocating wiper which is carried on a movable window of a vehicle and moves with the window as it is extended and retracted. One feature of the windshield wiper system disclosed herein is the generation of a straight line movement of the wiper across the window to be wiped which results in a very high percentage of the glass being cleaned in contradistinction to typical windshield wipers that move in an arc.

---

This invention relates to windshield wiper mechanism and more particularly to a windshield wiper adapted for use on a movable rear window of a vehicle such as is common to station wagon rear tailgate windows.

Due to the general design configuration of station wagons, the rear window thereof tends to be susceptible to foreign material deposited thereon during vehicle motion which can obscure the view therethrough. One problem associated with providing windshield cleaning mechanisms for this type window is the fact that the window is retractable into the tailgate. The prior art shows windshield wipers adapted for use on station wagon rear tailgate windows that provide a parking place for the wiper off the glass. This keeps the window free for movement but the mechanism needed to bring about this type of wiper mechanism are rather expensive, bulky, and generally unacceptable. The present invention obviates many problems associated with wiping movable windows in that the wiper mechanism is carried by the glass itself and, therefore, moves with the glass as the window is opened or closed. In this manner, a fixed relationship is set up between the wiper and the window resulting in a much more economical and efficient tailgate window wiper apparatus.

It is an object of the present invention to provide an improved windshield wiper mechanism for use on station wagon tailgate windows.

It is another object of the present invention to provide improved windshield wiping apparatus that is carried by a movable window to be cleaned and which has a wiping pattern substantially covering entire expanse of the window.

It is still another object of the present invention to provide an improved windshield wiping mechanism which traverses a window to be cleaned in a straight line manner and which is reciprocably driven by a flexible drive cable.

It is still a further object of the present invention to provide improved windshield wiping apparatus which functions to wipe a movable tailgate window on a station wagon and which is inconspicuous when in a parked position with the window closed and which is completely concealed with the window open.

Further objects and advantages of the present invention will be apparent from the following description, reference being had to the accompanying drawings wherein a preferred embodiment of the present invention is clearly shown.

In the drawings:

FIGURE 1 is a perspective view of the subject invention shown in its operative environment;

FIGURE 2 is an enlarged fragmentary view of the subject invention shown in FIGURE 1;

FIGURE 3 is a sectional view taken along line 3—3 of FIGURE 2.

Referring to FIGURE 1, a station wagon type vehicle 10 is illustrated as having a rear window opening 12 formed between body portions of the vehicle 10 and the movable tailgate 14. A window 16 is shown by the dotted lines and contained within tailgate 14 in a down position. A wiper blade and arm 18 is shown positioned on window 16 within the confines of tailgate 14.

Referring to FIGURE 3, a channel-shaped support member 20 engages the lower edge of windshield 16 and includes an extension 22 provided with a channel 24 adapted to receive a substantially closed circular tube 26.

It is clear that support member 20, extension 22, channel 24, and tube 26 are fixed with respect to window 16 and move therewith.

V-shaped support member 28 engages flange 30 integrally formed with tube 26. A member 32 having a knurled exterior engages a conventional wiper arm and blade assembly 18. Support member 28 includes a substantially circular portion 34 complementary shaped to the inside diameter of tube 26 and includes a solid slug 36.

Slug 36 is shown in FIGURE 2 in dotted lines and engages flexible drive cable 38 which in turn is driven by an output member 40 of disc motor 42. Disc motor 42 is of the reversible type which causes a reciprocating movement in cable 38 through positioning rollers 44.

In operation, a windshield mechanism described herein is designed to operate when the window opening 12, as seen in FIGURE 1, is closed by glass 16, in which position wiper arm and blade assembly 18 is exposed to the exterior of the vehicle. This is the position shown for the mechanism in FIGURE 3. An interlock of well known design is used to prevent windshield wiper operation with window 16 in the down position.

Referring to FIGURE 2, a switch conveniently located in the driving compartment of the vehicle is energized and disc motor 42 receives power in a conventional manner. Disc motor 42 drives cable 38 to the right, as viewed in FIGURE 2, thereby carrying slug 36 and support member 28 to the right as viewed therein. Wiper blade and arm assembly 18 thereby begins a movement to the right across window 16 to accomplish a wiping of the surface. The movement of flexible cable 38 driving asesmbly 18 continues across window 16 to a predetermined point wherein, typically, a limit switch would be provided to cause a reversing of disc motor 42. Thereafter, flexible cable 38 moves toward the left, as viewed in FIGURE 2, after having reached an extreme rightward position and returns to a parked position. The parked position in the example shown would be on the extreme left so that the wiper blade and arm mechanism 18 lines up with opening 46 formed between tailgate 14 and window 16 at one extreme of movement. Except for this park position, opening 46 is rather narrow and is merely wide enough to allow the translational movement of support member 28 therein. The enlarged portion of the opening is best seen in FIGURE 3.

When wiper arm and blade assembly 18 has made a complete wiping pattern across window 16 and has returned to a parked position, well-known mechanism, such as a limit switch, can be provided to deenergize disc motor 42 resulting in an end of the wiping cycle automatically or the wiping cycle could continue until disc motor 42 is positively deenergized by the switch in the driving compartment. Whether the system is continuous or operates only on demand would be left to the designer of the system and the exigencies of the particular installation. Electrically, the present invention can be controlled by use of mechanism well known in the windshield wiping art.

It is clear that the present invention has particular utility when used on a station wagon tailgate window because of the movable nature thereof but it is equally clear that the invention is utilizable either on a stationary window or on a movable window, such as would be found on vehicles other than station wagons. It is likewise clear the movable window need not be in the rear of the vehicle but might be in a vehicle door bringing about the same problems associated with wiping a tailgate window. The type of motion generated by the wiper of the present invention results in a substantially square or oblong area being almost completely wiped which is a feature not possible with typical windshield wipers moving in an arcuate path. It is also clear that the reversing of the wiper of the present invention can be effected by use of a continuous belt arrangement or a crank mechanism if it is not desirable in a given installation to utilize a reversible motor.

In summary, the instant invention provides a very effective way of wiping a movable window of a vehicle in a manner providing a wiping pattern that can be tailored to suit the size of the area to be wiped. It would also be within the skill of an artisan to provide articulating linkage on the present invention to bring about a cocking of the wiper blade to wipe obscure areas of a window by the mere addition of camming structure or the like.

While the embodiment of the present invention, as herein disclosed, constitutes a preferred form, it is to be understood that other forms might be adopted.

What is claimed is:

1. In combination with a vehicle having spaced inner and outer body panels defining a top opening and a window whose lower edge is disposed between the panels and with the window being generally vertically movable through the opening between closed and open positions, a window wiping mechanism for wiping the window comprising: a support means carried by the window at its lower edge and which is movable with the window when the latter is moved, wiper means supported by said support means for movement relative thereto in opposite directions and which extends through the top opening when the window is in its closed position; and a drive means operatively connected with the wiper means for moving the same in opposite directions across the window.

2. In combination with a station wagon vehicle having a tailgate which includes spaced inner and outer panels defining a top opening and a tailgate window whose lower edge is disposed between the panels and which is adapted to be reciprocably moved through the top opening between closed and open positions, a tailgate window wiping mechanism for wiping the tailgate window comprising: an elongated support means carried by the window at its lower edge and which is movable with the window when the latter is moved; a wiper means supported by said support means for linear movement relative thereto in opposite directions and which is engageable with the window for wiping the same; and a drive means operatively connected with the wiper means for linearly moving the wiper means in opposite directions across the tailgate window.

3. The combination as defined in claim 2 wherein said support means comprises a channel carried by the window and a generally circular tube having an opening in its side wall, wherein said wiper means comprises a wiper secured to a slide means slidably supported by said tube for linear movement relative thereto, and wherein said drive means includes a flexible drive member secured to said slide means.

4. A window wiping mechanism for wiping a rear window on a vehicle and with the window being supported for movement through an elongated top opening defined by spaced inner and outer panels between a closed position and an open position in which it is disposed behind the outer panel comprising: a support channel carried by the lower edge of the rear window and which is movable therewith; an elongated support tube carried by a portion of said channel and fixed thereto; a slide means slidably supported by said tube and which is movable relative to said tube along its length; a wiper means carried by said slide means and movable therewith, said wiper means extending through said top opening when the window is in its closed position; a flexible drive means operatively connected with said slide means for effecting translational movement of said slide means relative to said tube and hence translational movement of said wiper means across said tailgate window; and a reversible drive motor for reciprocating the latter.

5. A window wiping mechanism as defined in claim 4 wherein said wiper means is disposed adjacent one side of the window when in a parked position and wherein said opening has an enlarged portion substantially aligned with said wiper means when the latter is in its parked position to provide clearance for the wiper means as the window is moved toward its open position behind the outer panel.

References Cited

UNITED STATES PATENTS

| 1,846,588 | 2/1932 | Dudley | 15—250.24 |
| 2,370,101 | 2/1945 | Whitted | 15—250.17 |
| 2,824,332 | 2/1958 | Gibson | 15—250.25 |
| 3,112,510 | 12/1963 | Forbush et al. | 15—250.01 |

PETER FELDMAN, *Primary Examiner.*

U.S. Cl. X.R.

15—250.29